United States Patent
De Caux Tilney

(10) Patent No.: US 9,676,925 B2
(45) Date of Patent: Jun. 13, 2017

(54) EXTRUDED SURFACE COVERING MATERIAL FOR COVERING A BOAT OR YACHT DECK OR ANOTHER OUTDOOR AREA AND AN EXTRUDED PRODUCT COMPRISING SUCH MATERIAL

(71) Applicant: Flexiteek International A/S, Oslo (NO)

(72) Inventor: Robert De Caux Tilney, Waltham Chase (GB)

(73) Assignee: Flexiteek International, AS, Tjuvholmen, Oslo (NO)

( * ) Notice: Subject to any disclaimer, the term of this patent is extended or adjusted under 35 U.S.C. 154(b) by 0 days.

(21) Appl. No.: 14/134,200

(22) Filed: Dec. 19, 2013

(65) Prior Publication Data

US 2015/0140272 A1    May 21, 2015

(30) Foreign Application Priority Data

Nov. 18, 2013 (SE) ...................................... 1351364

(51) Int. Cl.

| | |
|---|---|
| C08K 7/22 | (2006.01) |
| B29C 47/04 | (2006.01) |
| B29C 47/06 | (2006.01) |
| B63B 5/24 | (2006.01) |
| C08K 7/24 | (2006.01) |
| C08K 7/28 | (2006.01) |
| E04F 15/02 | (2006.01) |
| E04F 15/10 | (2006.01) |
| B63B 5/08 | (2006.01) |
| C08K 5/00 | (2006.01) |

(52) U.S. Cl.
CPC .............. *C08K 7/22* (2013.01); *B29C 47/046* (2013.01); *B29C 47/06* (2013.01); *B63B 5/24* (2013.01); *C08K 5/0016* (2013.01); *C08K 7/24* (2013.01); *C08K 7/28* (2013.01); *E04F 15/02172* (2013.01); *E04F 15/105* (2013.01); *B63B 5/08* (2013.01); *C08K 2201/003* (2013.01); *Y10T 428/24438* (2015.01)

(58) Field of Classification Search
CPC ......... B29C 47/046; B29C 47/06; B63B 5/24; B63B 5/06; C08K 7/22; C08K 7/28; E04F 15/10; C08L 27/06; Y10T 428/24066; Y10T 428/24355; Y10T 428/24438
USPC ....................................................... 428/151
See application file for complete search history.

(56) References Cited

U.S. PATENT DOCUMENTS 3,353,981 A * 11/1967 Jacob ............................ 442/136
3,786,004 A * 1/1974 Adachi et al. ................ 521/138
4,303,730 A * 12/1981 Torobin ........................ 428/333
(Continued)

FOREIGN PATENT DOCUMENTS

| CN | 101497723 A | 8/2009 |
| GB | 2456605 A | 7/2009 |

(Continued)

*Primary Examiner* — Nathan Van Sell
(74) *Attorney, Agent, or Firm* — Santucci Priore, PL; Ted Whitlock

(57) ABSTRACT

The invention relates to an extruded surface covering material for covering a boat or yacht deck or another outdoor area, the surface covering material comprising a synthetic material, where the surface covering material further comprises rigid hollow microballoons with an opaque surface. The invention also relates to an extruded product.

12 Claims, 1 Drawing Sheet

(56) References Cited

U.S. PATENT DOCUMENTS

| | | | |
|---|---|---|---|
| 5,346,954 A * | 9/1994 | Wu et al. ........................ | 525/85 |
| 5,869,173 A * | 2/1999 | Zheng et al. ............... | 428/313.3 |
| 6,171,688 B1 * | 1/2001 | Zheng et al. ............... | 428/313.5 |
| 7,037,865 B1 | 5/2006 | Kimberly | |
| 2001/0051249 A1 * | 12/2001 | Gagas et al. .................... | 428/99 |
| 2004/0012118 A1 * | 1/2004 | Perez et al. ................... | 264/257 |
| 2005/0245645 A1 * | 11/2005 | Howie, Jr. ............ | C08F 265/04 |
| | | | 524/1 |
| 2007/0043129 A1 * | 2/2007 | Chou et al. ..................... | 521/54 |
| 2008/0039552 A1 | 2/2008 | Priegel | |
| 2010/0279100 A1 | 11/2010 | Heikkila et al. | |
| 2011/0167744 A1 | 7/2011 | Whispell et al. | |
| 2012/0088858 A1 * | 4/2012 | Guiselin et al. .............. | 521/143 |
| 2012/0288678 A1 | 11/2012 | Grube et al. | |

FOREIGN PATENT DOCUMENTS

| | | |
|---|---|---|
| JP | 3959812 B2 | 8/2007 |
| JP | WO2008062605 A1 | 5/2008 |
| JP | 2010084398 A | 4/2010 |
| JP | 2011219977 A | 11/2011 |

\* cited by examiner

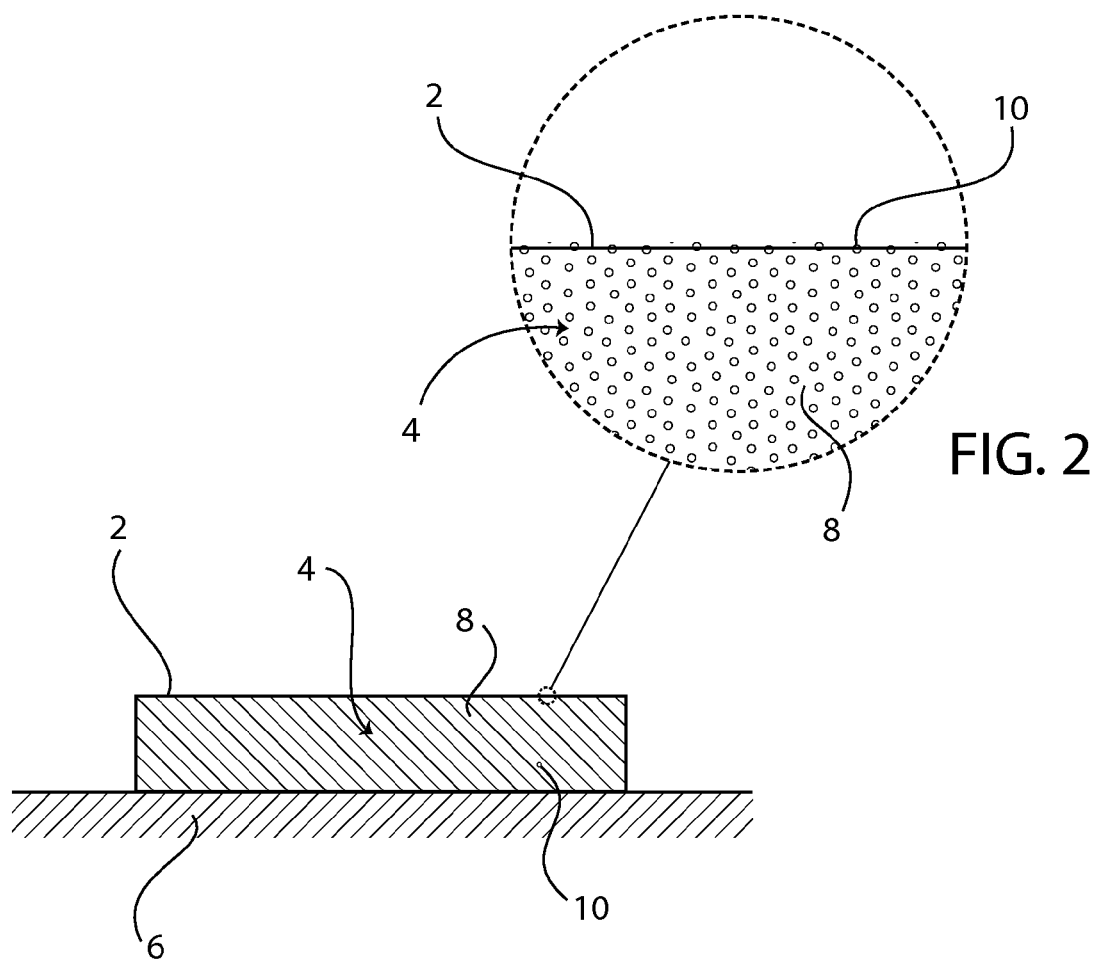

EXTRUDED SURFACE COVERING MATERIAL FOR COVERING A BOAT OR YACHT DECK OR ANOTHER OUTDOOR AREA AND AN EXTRUDED PRODUCT COMPRISING SUCH MATERIAL

CROSS-REFERENCE TO RELATED APPLICATION

This application claims priority to Swedish Patent Application No. 1351364-3 filed Nov. 18, 2013, the entirety of which is incorporated by reference.

FIELD OF THE INVENTION

The present invention relates to an extruded surface covering material for covering a boat or yacht deck or another outdoor area. The present invention also relates to an extruded product comprising such material.

BACKGROUND OF THE INVENTION AND RELATED ART

Boat and yacht decks can be made of different materials such as e.g. wood or fiberglass, etc. Traditionally, if the deck surface of a boat or yacht was to be covered, this was done by applying a teak decking to the boat or yacht deck surface. More recently, boat or yacht deck surfaces have also been covered with synthetic decking, i.e., synthetic materials have been used instead of teak material.

EP 1 196 672 B2 and U.S. Pat. No. 6,895,881 C1 and GB 2456605 B show examples of surface coverings comprising synthetic material such as PVC.

An example of a traditional synthetic decking, i.e. a decking made of a synthetic material, is a PVC (polyvinyl chloride) synthetic decking having chalk as a filler. Teak decking and such traditional PVC synthetic decking have different properties. One significant difference is that teak decking needs regular maintenance to a larger extent if the new look of the decking is to be upheld.

A traditional PVC synthetic decking having chalk as a filler has many advantages over traditional teak decking, but when the sun is shining and heats up such a traditional PVC synthetic decking, 30 the traditional PVC synthetic decking is heated up and retains the heat to a larger extent than traditional teak decking of the same dimensions.

SUMMARY OF THE INVENTION

The primary object of the present invention is to provide an improved extruded surface covering material for covering a boat or yacht deck or another outdoor area, and an extruded product comprising such material.

The above mentioned object of providing an improved extruded surface covering material for covering a boat or yacht deck or another outdoor area, and an extruded product comprising such material, is achieved for an extruded surface covering material for covering a boat or yacht deck or another outdoor area, the surface covering material comprising a synthetic material, where the surface covering material further comprises rigid hollow microballoons with an opaque surface.

An advantage with such an inventive synthetic decking material for a boat or yacht deck or another outdoor area is that such a synthetic decking material is kept cooler than, and is able to cool faster than, a traditional PVC synthetic decking material of the same dimensions, thus allowing for a more comfortable surface temperature when e.g. standing barefoot on a synthetic decking of the inventive material. A further advantage is that such an inventive synthetic decking material is lighter than a traditional PVC synthetic decking material of the same dimensions, thus both saving weight and allowing for an easier handling when applying it to a boat or yacht deck or another outdoor area.

According to one embodiment, the percentage by volume of microballoons in the extruded surface covering material is 5-40%.

According to one embodiment, the synthetic material is rigid UV-stable PVC or another rigid UV-stable material.

According to one embodiment, the extruded surface covering material is an extruded flexible shape conforming surface covering material, and the synthetic material is a flexible synthetic material.

According to one embodiment, the synthetic material is plasticized UV-stable PVC or another flexible UV-stable material.

According to one embodiment, a flexible extruded surface covering material comprises a percentage by volume of 10-30% microballoons, 40-60% PVC and 15-35% plasticizer.

According to one embodiment, a flexible extruded surface covering material comprises a percentage by volume of 15-25% microballoons, 45-55% PVC and 25-30% plasticizer.

According to one embodiment, the rigid hollow microballoons comprise glass or ceramic material.

According to one embodiment, the rigid hollow microballoons are filled with gas.

According to one embodiment, that the outer diameter of the microballoons is in the range of 10 to 300 micrometers.

According to one embodiment, the hollow microballoons are arranged substantially uniformly distributed in the extruded surface covering material.

These and other advantageous features will be apparent from the detailed description below.

The invention will now be described in more detail below with reference to the appended drawings which schematically illustrate a preferred embodiment of the extruded surface covering material for a boat or yacht deck or another outdoor area according to the invention.

BRIEF DESCRIPTION OF THE DRAWINGS

FIG. 1 shows schematically a cross-section of an extruded surface covering material for covering a boat or yacht deck or another outdoor area, according to one embodiment of the invention, and FIG. 2 shows schematically a cross-section of a surface part of the extruded surface covering material of FIG. 1 in enlargement.

DESCRIPTION OF PREFERRED EMBODIMENTS

The same reference numerals are being used for similar features in the different drawings.

FIG. 1 shows schematically a cross-section of a piece 2 of an extruded surface covering material 4 for covering a boat or yacht deck or another outdoor area 6, according to one embodiment of the invention. The surface covering material 4 comprises a synthetic material 8, and further comprises rigid hollow microballoons 10 with an opaque surface.

By including hollow microballoons 10 in the extruded surface covering material 4 for covering a boat or yacht deck or another outdoor area 6 which is exposed to UV-radiation from the sun, the advantage of a cooler extruded surface covering material 4 is achieved as will be discussed in more detail below. As an additional advantage, the hollow microballoons 10 also increase the resistance to compressive stress in the extruded surface covering material 4, and further make the extruded surface covering material 4 lighter.

The extruded surface covering material 4 is preferably manufactured by extrusion of a mixture of a synthetic material 8, such as e.g. PVC or an extrudable synthetic resin, to which synthetic material 8 the hollow microballoons 10 are added before the extrusion. The hollow microballoons 10 are arranged well distributed, preferably arranged substantially uniformly distributed, in this mixture and thus in the resulting extruded material in order to avoid large clusters of microballoons 10 in the synthetic material 8 which could make the extruded surface covering material 4 brittle at these clusters thus leading to breakage of the extruded material. In order to minimize the breakage of the microballoons, a progressive cavity pump can be used.

The extruded synthetic material 8 can be rigid UV-stable PVC or another rigid UV-stable material such as resin.

If the extruded surface covering material 4 is an extruded flexible shape conforming surface covering material 4, the synthetic material 8 is a flexible synthetic material 8 e.g. plasticized UV-5 stable PVC or another flexible UV-stable material such as resin.

Depending on if the extruded surface covering material 4 is to be rigid or flexible, additives such as e.g. a plasticizer can be added before the extrusion or in connection with the extrusion process.

Additional additives such as resin in order to make the hollow microballoons 10 to better bond to the PVC material and to improve the smoothness of the extrusion process and to facilitate the uniform distribution of the microballoons 10 in the resulting extruded flexible shape conforming surface covering material 4 can also be added to the mixture before the extrusion or in connection with the extrusion process.

FIG. 2 shows schematically a cross-section of a surface part of the extruded surface covering material 4 of FIG. 1 in enlargement. When a piece 2 of the inventive extruded surface covering material 4, e.g. in the form of a product comprising the inventive extruded surface covering material 4, is fitted to a boat or yacht deck or another outdoor area 6, such as e.g. a relax area around an swimming-pool, to cover this boat or yacht deck or outdoor area 6, then at least some surface of this piece 2 will be exposed to possible incoming UV-radiation from the sun.

As mentioned above, the inventive extruded surface covering material 4 does not get as warm as traditional PVC synthetic decking material or traditional teak decking material when exposed to UV-radiation, as the opaque surface of those hollow microballoons 10 arranged at the surface exposed to UV-radiation reflect heat and UV radiation, and as the hollow microballoons both at the surface and the interior of the extruded surface covering material 4 do not accumulate as much heat per volume as the surrounding flexible synthetic material 8. This also has the further advantage that the extruded surface covering material 4 also cools faster than traditional PVC synthetic decking material and traditional teak decking material as will be discussed in more detail below.

It is possible to arrange microballoons 10 at the surface only or at the interior only of the extruded surface covering material 4, but this will not give the combined advantage of both reflection and decreased heat accumulation mentioned above. Thus it is preferable to arrange the hollow microballoons 10 substantially uniformly distributed in the extruded material, i.e. both at the surface and in the interior of the extruded material.

The relative percentage by volume between the hollow microballoons 10 and the synthetic material 8 in the extruded surface covering material 4 will affect the properties of the extruded surface covering material 4. A too large share of microballoons 10 will make the extruded surface covering material 4 brittle. A too small share of microballoons 10 will not give the desired cooling properties.

A suitable percentage by volume of microballoons 10 in the extruded surface covering material 4 is 5-40% in order to obtain the desired cooling properties without the undesired brittleness. The hollow microballoons 10 are preferably well distributed, more preferably substantially uniformly distributed, in the extruded material, i.e. arranged both at the surface and in the interior of the extruded material.

Taking an extruded flexible shape conforming surface covering material 4 as an example, a material with a percentage by volume of 10-30% microballoons, 40-60% PVC and 15-35% plasticizer together with further components such as stabilizer, color pigments and other additives could be used.

The outer diameter of the microballoons 10 is preferably in the range of 10 to 300 micrometers, e.g. in the range of 30 to 200 micrometers, e.g. having a diameter of about 100 micrometers.

The combination of the percentage by volume of microballoons 10 in the extruded surface covering material 4 and the outer diameter of the microballoons 10 will affect the outer appearance of the surface of a piece 2 of the inventive extruded surface covering material 4. The smaller the microballoon diameter is, the smoother the surface of the piece 2 of the inventive 7 extruded surface covering material 4.

The microballoons 10 are preferably of glass and substantially spherical, i.e. are so called glass microspheres, but can also be made of e.g. ceramic material and have any shape, e.g. spherical, cube shaped etc.

Some examples:

Taking an extruded flexible shape conforming surface covering material 4 as an example, a percentage by volume of 15-25% microballoons, 45-55% PVC, 25-30% plasticizer together with further components such as stabilizer, color pigments and other additives was found to give a strong extruded flexible shape conforming surface covering material 4 which is not brittle and which as a further advantage is about 25% lighter compared to a traditional PVC decking material with chalk filler.

A comparison test was made by a third-party test institute using a piece 2 of the above mentioned inventive extruded flexible shape conforming surface covering material 4 and a piece 2 of traditional teak decking material both having a thickness of 7-8 mm and the same length and width. The outer diameter of the microballoons 10 used was about 100 micrometers. The surface of the respective decking material was heated up to 65.6° C., whereafter the cooling rates were measured for the respective decking materials. The cooling rate for the above mentioned inventive extruded flexible shape conforming surface covering material 4 was 4.2° C./min compared to a cooling rate for traditional teak decking material of 3.6° C./min.

Another comparison test was made by a third-party test institute using a piece 2 of the above mentioned inventive extruded flexible shape conforming surface covering material 4 and a piece 2 of traditional flexible PVC decking material (the original Flexiteek® material with PVC and chalk filler), both having a thickness of 5 mm and the same length and width. The outer diameter of the microballoons 10 used was about 100 micrometers. The surface of the respective decking material was heated, whereafter the surface temperatures were measured. The surface of the inventive extruded flexible shape conforming surface covering material 4 was found to be about 5° C. cooler than that of the traditional PVC decking material.

As mentioned above, the inventive extruded surface covering material 4 for covering a boat or yacht deck or another outdoor area 6 can comprise a rigid or flexible, preferably UV-stable, synthetic material 8. If the inventive extruded surface covering material 4 is flexible and thus comprises a flexible synthetic material 8 and further comprises rigid hollow microballoons 10 with an opaque surface, it can be laid in curved formations on the boat or yacht deck or another outdoor area 6 when necessary, and can thus abut against the surface of the boat or yacht deck or another outdoor area 6 even if the surface of the boat or yacht deck or another outdoor area 6 is curved. If necessary, the inventive surface covering material 4 can be shaped by applying heat to it e.g. with a hot-air gun in order to further adapt the curvature of the surface covering material 4 to a curved part of the boat or yacht deck or another outdoor area 6.

By adding one or more suitable color pigments before extrusion or at the extrusion process, the color of the inventive surface covering material 4 can e.g. imitate the color of wood such as e.g. teak, mahogany, pine, Oregon pine, redwood, etc., or can be of any other dark or light color such as e.g. black or white. That surface, here also called the "outer surface", of the inventive surface covering material 4 which surface is intended to be exposed to e.g. walking feet and/or UV-radiation and/or to be visible to people after fitting of the inventive surface covering material 4 to a boat or yacht deck or another outdoor area 6, can be roughened, e.g. sanded or filed etc., so as to imitate any grain effect of wooden material even if the material is black or white. Other abrasive methods can also be used on the upper surface of the surface covering material 4. The surface covering material 4 gives an upper surface of non-slip character both with and without such surface modification.

The inventive surface covering material 4 can be used for any shapes, e.g. strips of material or sheets of material, etc., and sizes and thicknesses of surface covering components. An example of a suitable thickness of the inventive extruded surface covering material 4 is 5 mm, another is 6 mm.

The inventive surface covering material 4 can be extruded separately or co-extruded with another material or with the same material of another color in order to imitate a wooden boat or yacht deck, e.g. a so called "teak decking with caulking between teak planks". As mentioned above, the combinations of colors in and the texture of the surface visible after fitting is easily changed by changing the components to be extruded, and various combinations such as e.g. teak-look with intermediate strips of e.g. black caulking or white caulking or other combinations are possible.

The surface covering material 4 is fitted, e.g. fixed, to the boat or yacht deck or another outdoor area 6 surface completely assembled or in sections preferably by means of an adhesive, and the strips and/or sheets etc. other possible shapes of the products comprising the inventive surface covering material 4 can be arranged with a suitable bottom, e.g. with grooves facilitating the fixing of the surface covering material 4 to the surface of the boat or yacht deck or another outdoor area 6, or without grooves or with other geometries.

A further advantage when compared to wood such as e.g. real teak, is that the inventive surface covering material 4 does not need fixing by screws to the boat or yacht deck or another outdoor area 6 surface when laid in straight or curved formations.

Two pieces of the extruded surface covering material 4 can also be glued and/or welded together with or without an intermediate caulking-strip like part. Two pieces of the extruded surface covering material 4 can also be laid side by side on a boat or yacht deck or another outdoor area 6 with or without a separating gap.

The extruded surface covering material 4 can also be used to cover other outdoor areas on boats or yachts than the boat or yacht deck, e.g. toe rails, rubbing rails, etc.

Thus, extruded products can be manufactured that comprise the inventive extruded surface covering material 4.

The features discussed above may be combined in further ways than those explicitly described above.

What is claimed is:

1. A surface covering material for covering a boat deck, the surface covering material having superior thermal characteristics and comprising:
    an extruded flexible shape conforming surface covering material including:
        an outer surface exposed to an outside ambient environment and arranged to be roughened so as to imitate a grain effect of wooden material;
        a percentage by volume of 45-55% synthetic material comprising PVC;
        a percentage by volume of 25-30% plasticizer; and
        a plurality of rigid hollow microballoons with opaque surfaces, the plurality of rigid hollow microballoons including a percentage by volume of 15-25% and being substantially uniformly arranged at an upper surface and an interior of the surface covering material.

2. The surface covering material according to claim 1, wherein:
    the synthetic material is flexible.

3. The surface covering material according to claim 1, wherein:
    the synthetic material is a flexible UV-stable material.

4. The surface covering material according to claim 1, wherein:
    the plurality of rigid hollow microballoons are at least one of a glass and ceramic material.

5. The surface covering material according to claim 1, wherein:
    the plurality of rigid hollow microballoons are filled with a gas.

6. The surface covering material according to claim 5, wherein:
    the gas is air.

7. The surface covering material according to claim 1, wherein:
    an outer diameter of the plurality of rigid hollow microballoons is in the range of 10 to 300 micrometers.

8. The surface covering material according to claim 1, wherein:
    an outer diameter of the plurality of rigid hollow microballoons is in the range of 30 to 200 micrometers.

9. The surface covering material according to claim 1, wherein:

an outer diameter of the plurality of rigid hollow microballoons is about 100 micrometers.

10. The surface covering material according to claim 1, further comprising:
the upper surface having non-slip properties.

11. A surface covering material for covering a boat deck, the surface covering material having superior thermal characteristics and comprising:
an extruded flexible shape conforming synthetic decking material including:
a percentage by volume of 45-55% synthetic material;
a percentage by volume of 25-30% plasticizer;
a plurality of hollow microballoons including a percentage by volume of 15-25% and being substantially uniformly distributed therein, the plurality of microballoons with opaque surfaces; and
an upper surface resembling a grain effect of wooden material.

12. The surface covering material according to claim 11, wherein the synthetic decking material further comprises:
a flexible property allowing the surface covering material to be laid and remain in curved formations only with adhesive and without use of additional fasteners.

\* \* \* \* \*